United States Patent [19]

Hallwirth

[11] Patent Number: 5,784,276
[45] Date of Patent: Jul. 21, 1998

[54] PROGRAMMING DEVICE

[75] Inventor: Volker Hallwirth, St. Georgen, Germany

[73] Assignee: Siemens Aktiengesellschaft, Munich, Germany

[21] Appl. No.: 793,020
[22] PCT Filed: Jul. 14, 1995
[86] PCT No.: PCT/DE95/00938
§ 371 Date: Jun. 4, 1997
§ 102(e) Date: Jun. 4, 1997
[87] PCT Pub. No.: WO96/04594
PCT Pub. Date: Feb. 15, 1996

[30] Foreign Application Priority Data

Aug. 1, 1994 [DE] Germany .......... 44 27 183.2

[51] Int. Cl.$^6$ .......... G06F 19/00
[52] U.S. Cl. .......... 364/191; 395/701
[58] Field of Search .......... 364/191, 192, 364/193, 146, 147, 140, 141, 188, 189; 395/701–710; 345/961, 964, 965, 966, 970, 326, 339

[56] References Cited

U.S. PATENT DOCUMENTS

| 5,481,716 | 1/1996 | Morshedi et al. .......... 364/191 X |
| 5,485,620 | 1/1996 | Sadre et al. .......... 364/191 X |
| 5,581,759 | 12/1996 | Ohhashi et al. .......... 364/191 X |
| 5,648,899 | 7/1997 | Hallwirth .......... 364/191 |

*Primary Examiner*—Joseph Ruggiero
*Attorney, Agent, or Firm*—Kenyon & Kenyon

[57] ABSTRACT

A programming device of a programmable status control system is provided for converting a control function to a control program for an automation device. The programming device with a graphic programming interface is suitable for programming a programmable status control system.

7 Claims, 7 Drawing Sheets

(INPUT BITS)
START KEY = E 0.0; //1 = DEPRESSED
FULL SENSOR = E 0.1; //1 = FULL
EMPTY SENSOR = E 0.2; //1 = EMPTY

FIG. 4

(OUTPUT BITS)
LAMP = A 0.0; //1 = ON
INLET = A 0.1; //1 = OPEN
HEATING = A 0.2; //1 = ON
OUTLET = A 0.3; //1 = OPEN

FIG. 5

(INTERNAL INPUT SIGNALS)
TIMER 1 = T1; //1 = TIMER 1 IS RUNNING
TIMER 2 = T2; //1 = TIMER 2 IS RUNNING

FIG. 6

FAB, FAE, FAG:

F00= NO STRING OF CHARACTERS TRIGGERING A FUNCTION

FAA:

F11= START     TIMER1  (// T1=1); DELAY TIME     600MS

FAC:

F33= START     TIMER1  (// T1=1); HEATING TIME     5MIN

FAD:

F44= START     TIMER2  (// T2=1); REACTION TIME     3 MIN

FAF:

F66= START     TIMER1  (// T1=1); RECOVERY TIME     30 S

FIG. 7

EVA:
START=START KEY =1, FULL SENSOR=0, EMPTY SENSOR=1, T1=0, T2=0;

EVB:
START FILLING =START KEY =X, FULL SENSOR=0, EMPTY SENSOR=1, T1=0, T2=0;

EVC:
START HEATING =START KEY =X, FULL SENSOR=1, EMPTY SENSOR=0, T1=0, T2=0;

EVD:
END HEATING =START KEY =X, FULL SENSOR=1, EMPTY SENSOR=0, T1=0, T2=0;

EVE:
START EMPTYING =START KEY =X, FULL SENSOR=1, EMPTY SENSOR=0, T1=0, T2=0;

EVF:
END EMPTYING =START KEY =X, FULL SENSOR=0, EMPTY SENSOR=1, T1=0, T2=0;

EVG:
STOP =START KEY =0, FULL SENSOR=0, EMPTY SENSOR=1, T1=0, T2=0;

---

AVA: LAMP_ON =LAMP =1, INLET =0, HEATING =0, OUTLET =0;

AVB: INLET_OPEN =LAMP =1, INLET =1, HEATING =0, OUTLET =0;

AVC: HEATING_ON =LAMP =1, INLET =0, HEATING =1, OUTLET =0;

AVD: HEATING_OFF =LAMP =1, INLET =0, HEATING =0, OUTLET =0;

AVE: OUTLET_OPEN =LAMP =1, INLET =0, HEATING =0, OUTLET =1;

AVF: OUTLET_CLOSED =LAMP =1, INLET =0, HEATING =0, OUTLET =0;

AVG: LAMP_OFF =LAMP =0, INLET =0, HEATING =0, OUTLET =0;

PROGRAMMING DEVICE

FIELD OF THE INVENTION

The present invention relates to a programming device of a programmable status control system.

BACKGROUND INFORMATION

German Patent Application No. 37 43 438 describes a device that causes a transition to a subsequent status and a transfer of new control data to an output stage according to an instantaneous status and an input vector allocation of digital process input quantities. A control data file, which contains the input quantities or combinations of these input quantities that are relevant for the given instantaneous status, is stored in the device.

German Patent Application No. 42 26 456 describes a programmable status control system that permits a transition in status from an instantaneous status to a subsequent status for several processors.

With such conventional status control system and the conventional device, reaction times to changes in input data are shortened significantly in comparison with a conventional programmable control system that gradually reads individual control program instructions out of a memory in accordance with processing by a von Neumann machine, interprets them and finally executes the corresponding operations.

The publication "Automation with SIMATIC S5-155U" by Hans Berger (1989) describes a programming device that is used to convert a control task into a control program for an automation device. All functions of the control task are programmed or described with a type of presentation such as an "instruction list," a "function plan" or a "contact plan." Regardless of the type of presentation, the programming device converts the programmed functions to an appropriate machine code. This code contains all the user-programmed control functions and is read and interpreted by the automation device after the code has been transferred to the automation device. With such a conventional programming device, writing a control program for a programmable status control system requires considerable programming effort. German Patent Application No. 42 35 432 discloses a programming device for a programmable status control system. The programming device has a memory where a control task created with a software tool is deposited in the form of an action-time diagram that can be displayed on a display device and describes the input and output signals of an engineering process to be controlled in the form of binary and/or analog signals. The action-time diagram is processed by the software tool by means of suitable analysis of level transitions of the signals to create a control program having a control and status code to solve the control task, starting from an instantaneous status, and appropriate input codes, control codes and status codes of the control program are created for the status control system. It is not necessary to know a programming language or the types of presentation conventionally used in automation technology for a control task.

German Patent Application No. 44 18 623 describes a programming device suitable for programming a programmable status control system with a structured text. The structured text is divided into several substructures, each of which is assigned to a status. Each substructure has a first key word with a string of characters that denote a status and is followed by at least one group of ordered pairs consisting of a key word and a text string. A first pair has a second key word and at least one input vector in the form of a string of characters followed by a second pair consisting of a third key word and a subsequent status in the form of another string of characters. If necessary to solve the control task, the substructures must have a third and fourth pair, the third of which is provided with a fourth key word and at least one output vector in the form of a string of characters, and the fourth pair includes a fifth key word and at least one function reference characterized by a string of characters. Such a structured text is easy to formulate and permits a straightforward presentation of the control task.

SUMMARY OF THE INVENTION

An object of the present invention is to provide a programming device with a graphic programming interface suitable for programming a programmable status control system.

Using such device, a programmer formulates a control task in the form of a status graph that has symbols for the statuses and for the input and output transitions. From these symbols the software tool generates a structured text (as described in German Patent Application No. 44 18 623 from which a suitable software tool in the form of a compiler and linker creates a control table executable in the status control system.

DETAILED DESCRIPTION OF THE INVENTION

Figure 1:
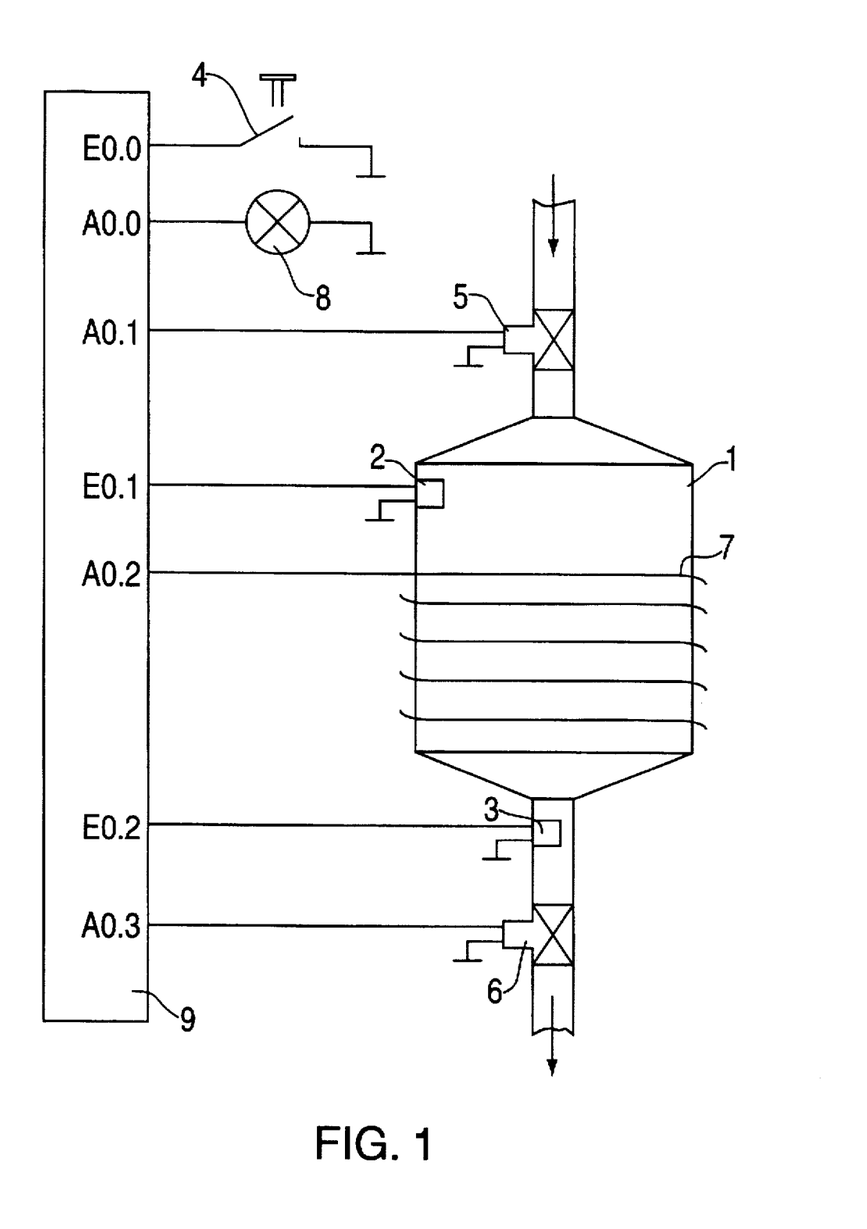
FIG. 1 shows a schematic diagram of a system controlled by a programmable status control system.

FIG. 1 shows a programmable status control system 9 that controls a reactor 1 on the basis of input signals E0.0, E0.1 and E0.2. Input signal E0.0 indicates that a reactor cycle has been started by a push-button 4, and input signals E0.1, E0.2 generated by sensors 2, 3 indicate that the reactor is full or empty, respectively. Output signal A0.0 is sent to an alarm lamp 8 and indicates the start of the reactor cycle. Output signals A0.1, A0.3 are sent to valves 5, 6 to control the inflow and outflow of a reactor fluid, and output signal A0.2 causes reactor 1 to be heated by heating system 7.

A control task now stipulates that a reactor cycle is to be started by push-button 4 and displayed by alarm lamp 8. For example 600 ms after the start, inlet valve 5 of empty reactor 1 is to be opened but outlet valve 6 must be closed during a filling operation. Furthermore, the control task specifies that inlet valve 5 must remain closed if the reactor is full and that heat is to be supplied to the liquid in reactor 1 via heating system 7 for a period of e.g. five minutes. Then a reaction time of e.g. three minutes is provided during which the liquid reacts to the heat supplied. When the three minutes have elapsed, the reactor is emptied. Inlet valve 5 remains closed and outlet valve 6 is opened for this purpose. When reactor 1 is empty, alarm lamp 8 is switched off after a recovery time of e.g. 30 seconds, thus indicating that the reactor cycle is completed and a new cycle can be started.

Figure 2:
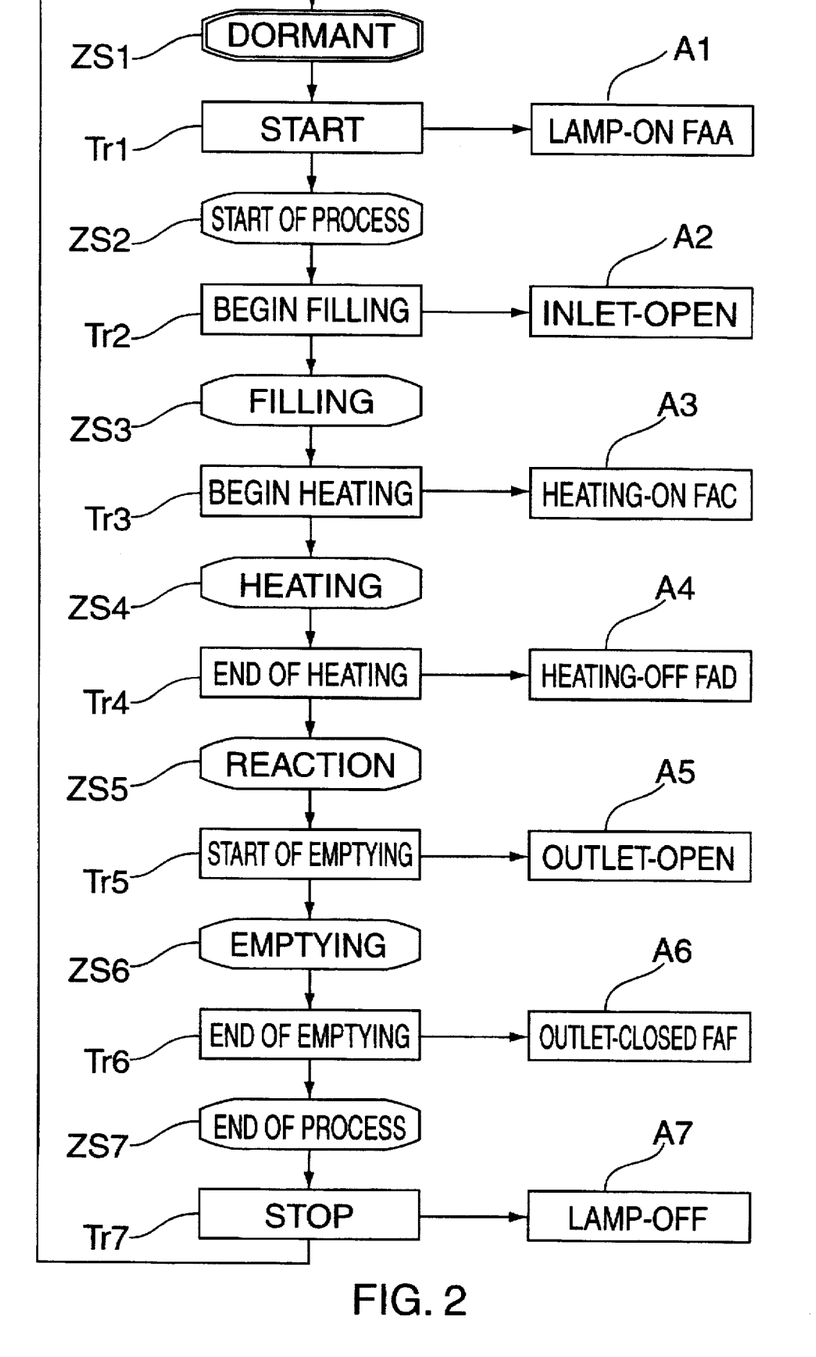
FIG. 2 shows a status graph.
Figure 3:
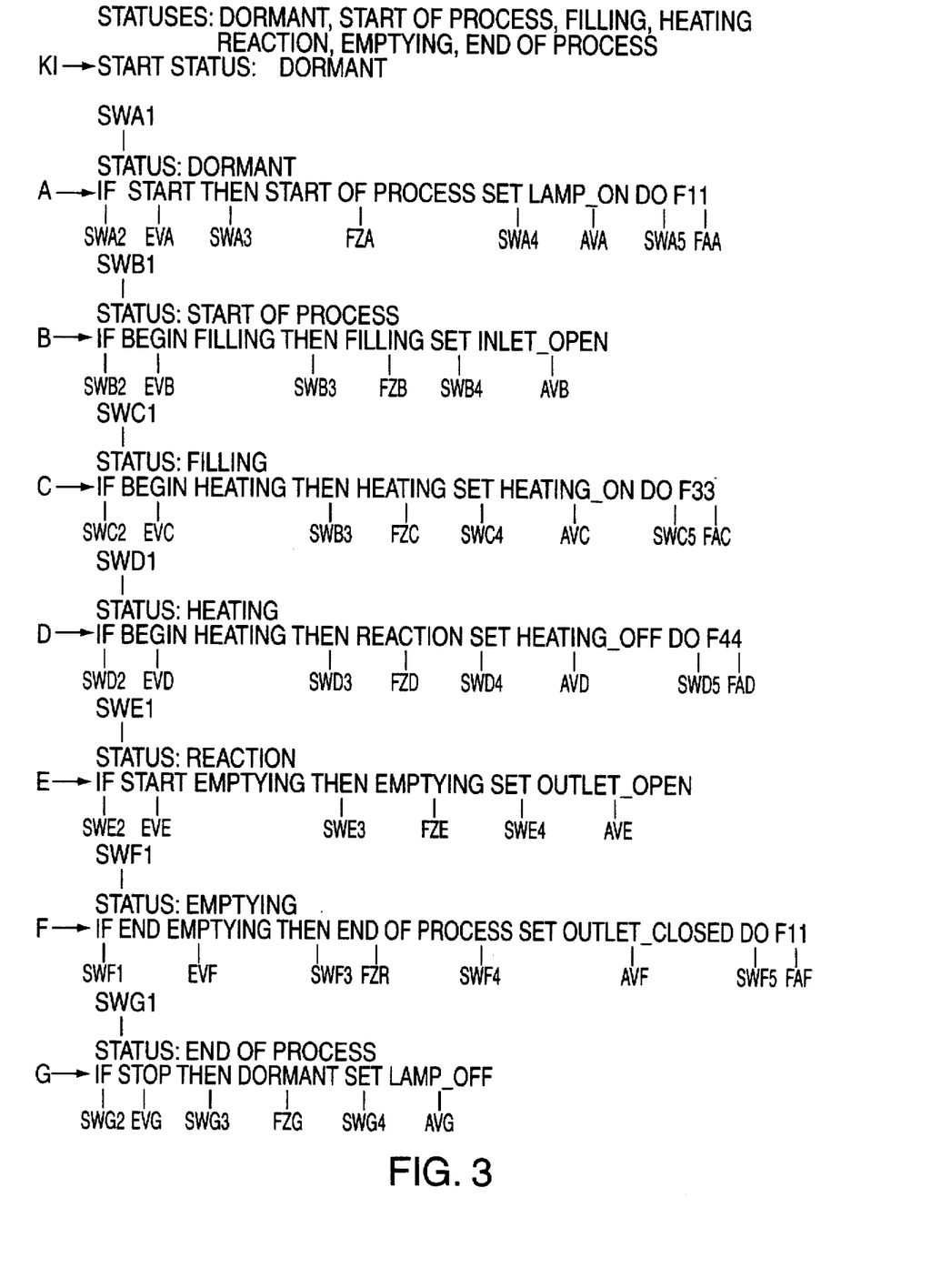
FIG. 3 shows a structured text.
Figure 9:
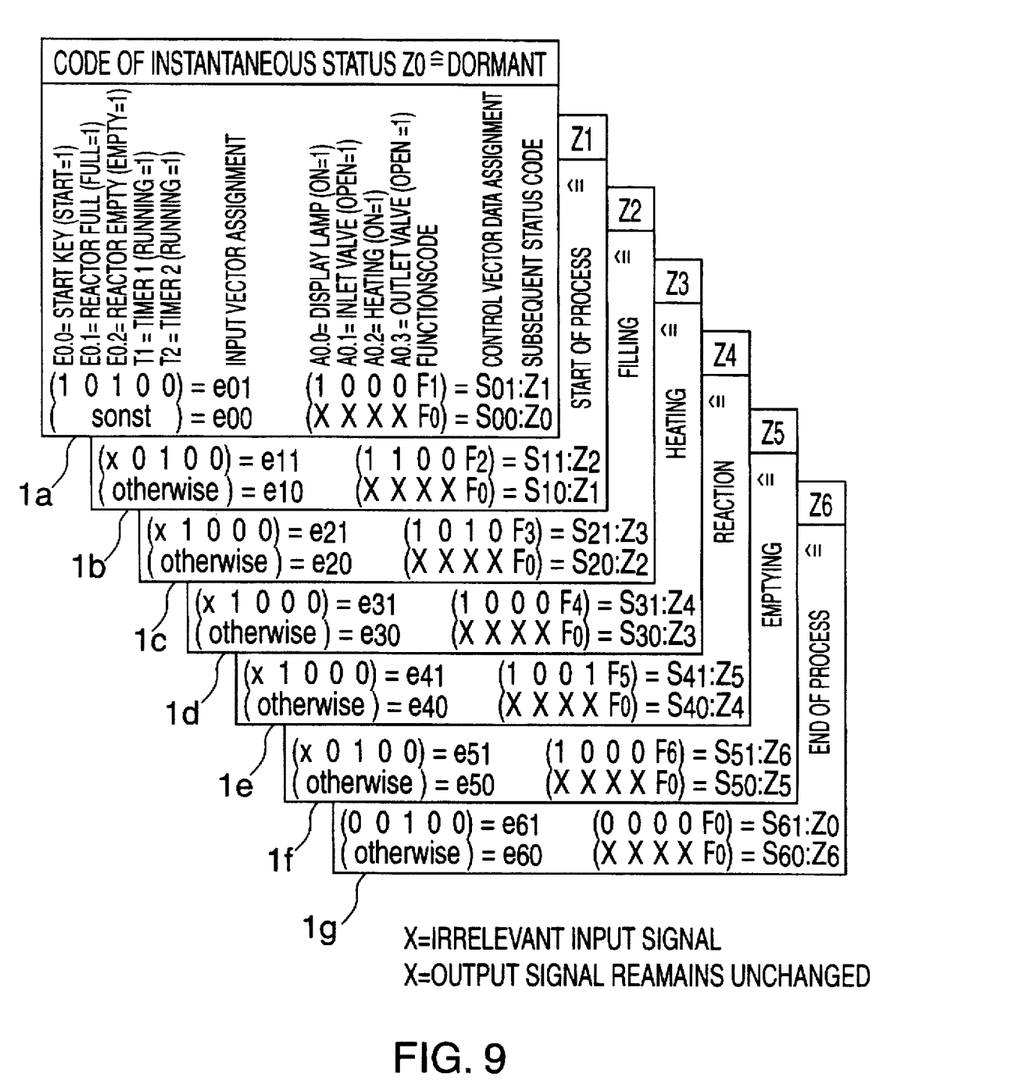
FIG. 9 shows a control program for the programmable status control system

A programmer with a programming device not shown here converts the control task formulated in this way to a status graph (shown in FIG. 2). The programming device equipped with a display device and a memory has a software tool deposited in the memory for this purpose and also has instructions and commands for representing the status graph on the display device. The software tool also converts this status graph to a structured text according to FIG. 3. Reference is made first to FIG. 9 to explain how further processing takes place. FIG. 9 shows a control program in the form of a control table that can also be represented on the display device and generates another software tool from the structured text as explained below. It is also possible to provide only a software tool suitable for creating the status graph, converting the status graph to a structured text and creating a control table from the structured text. For a better overview, the control table is subdivided into blocks 1a . . . 1g, each of which is assigned to a status Z0 . . . Z6 and stored in appropriate areas of the memory. Z0 . . . Z6 denote the codes for the statuses "dormant," "start of process," "filling," "heating," "reaction," "emptying" and "end of process"; $e_{ij}$ denotes the input vector assignments formed from the binary values of the input signals E0.0 . . . and internal signals T1, T2 of the status control system 9, and $S_{ij}$ denotes the control data vector assignments formed from the binary values of input signals A0.0 . . . and function codes F0 . . . F6, where I=0, 1 . . . 6; j=0, 1. The character x denotes that the binary value of an input signal E0.0 . . . assigned to this character is irrelevant, i.e., the corresponding input and control data vector is formed independently of the binary value of this input signal. The character X in the control data vector assignment means that the binary values of the output signals A0.0 . . . remain unchanged with the corresponding input vector assignments.

In this embodiment of the present invention, a status graph with symbols for statuses and input and output transitions is shown (FIG. 2). The status symbols are characterized by rounded rectangles ZS1 . . . ZS7 and strings of characters assigned to them ("dormant,""start of process,", "filling (the reactor)," "heating (the reactor liquid)," "emptying (the reactor)" and "end of process."The starting status is the "dormant" status which is symbolized by a double border. Symbols Tr1 . . . Tr7 for the input transitions are shown between the status symbols ZS1 . . . ZS7. In the present example, only one directional line leads from a status to an input transition, which results from the requirements of the control task. It is of course possible for solving complex control tasks to require a status graph containing a directional line that branches off from a status symbol and ends in several input transition symbols. A line leads from the "dormant" starting status to an input transition Trn with a "start" string of characters from which another directional line leads to the subsequent "start of process"status and another directional line leads to action symbol A1. The "start" string of characters designates an input vector whose bit assignment is discussed in greater detail below. According to the stipulations of the control program, additional input transitions with the assigned strings of characters "begin filling," "begin heating," . . . "stop" are shown as symbols in the form of rectangles Tr2, Tr3 . . . Tr7. Starting from a status symbol ZS1 . . . ZS7, a directional line leads to these transitions Tr1 . . . Tr7 from each of which a directional line again leads to a status symbol and a directional line leads to the action symbol A1 . . . A7 according to the stipulations of the control program. These symbols A1 . . . A7 have strings of characters written into them to describe output quantities as well as function references, as discussed further below. Action symbol A1 contains an output quantity in the form of the string of characters "lamp_on, " action symbol A2 contains the output quantity "inlet_open," action symbol A3 contains the output quantity "heating_on," action symbol A4 contains the output quantity "heating_off" action symbol A5 contains the output quantity "outlet_open," action symbol A6 contains the output quantity "outlet_closed" and action symbol A7 contains the output quantity "lamp_off." As additional output quantities, action symbols A1, A3, A4, A6 and A7 represent function references FAA, FAC, FAD and FAF which stipulate the process times of the control task according to time-limit switch settings of status control system 9 (shown in FIG. 1), as explained below. These form internal binary input signals T1, T2 that control the heating and reaction time as well as the delay times with regard to the opening of inlet valve 5 and turning off lamp 8 according to the requirements described in the control task.

Further processing of the status graph (shown in FIG. 2) for creation of a structured text (shown in FIG. 3) by the software tool is explained in greater detail below.

The software tool creates from the seven status symbols ZS1 . . . ZS7 a structured text with seven substructures A . . . G (shown in FIG. 3), each of which is assigned to a status. The statuses are deposited in the form of character strings in header information KI and include the statuses "start of process," "filling (the reactor)," "heating (the reactor liquid)," "emptying (the reactor)" and "end of process"according to the designations (character strings) of the status symbols. The "dormant" status is marked as the initial status on the status graph and is also stored in the header information. The software tool creates from the instantaneous "dormant" status symbol (shown in FIG. 2) a first key word SWA1 (substructure A, FIG. 3) in the form of the "status"character string to which a "dormant" string of characters designating an instantaneous status is assigned. The software tool forms a group of ordered pairs, each consisting of a key word and a character string, from input transition symbol Tr1 and the "start" character string assigned to this symbol, the action symbol A1 and the "lamp_on" character string assigned to this symbol and also from the symbol ZS2 of the subsequent status and the "start of process" string of characters. A first pair of this group includes a second key word SWA2 ("IF"character string) and an input vector EVA in the form of a "start" character string. A second pair follows this input vector EVA and is provided with a third key word SWA3 ("THEN"string) and with a subsequent status FZA characterized by a "start of process" character string. A third pair following the subsequent status FZA includes a fourth key word SWA4 ("SET" string) and an output vector AVA in the form of a "lamp_on" string. The software tool forms a fourth pair with a fifth key word SWA5 ("DO" string) and the function reference FAA ("F11" string) from the function reference FAA. This fourth pair follows output vector AVA.

Substructures B . . . G are formulated in the same way as defined by the status graphs, where SWxy (x=B, C, . . . G; y=1, 2, . . .) denotes the first, second, etc. key words, EVk and AVk denote the input and output vectors, FZk denotes the subsequent statuses and FAk(k=B, C, . . . G) denotes the function references of substructures B, C, . . . G. The software tool takes into account the fact that no fifth key word and no function reference are needed for substructures B, E and G because no entries in the form of function references are made in the corresponding action symbols A2, A5 and A7.

Figure 4:
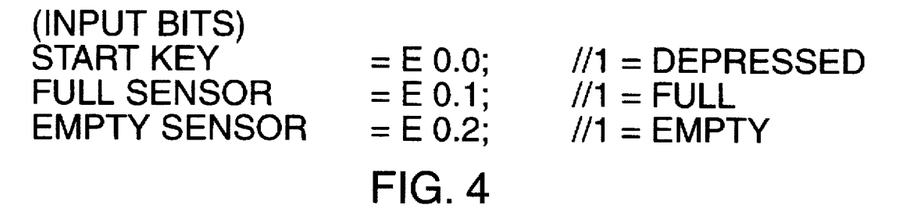
FIG. 4 shows a first table for an assignment of input and output signals, function references and input and output transitions.
Figure 5:
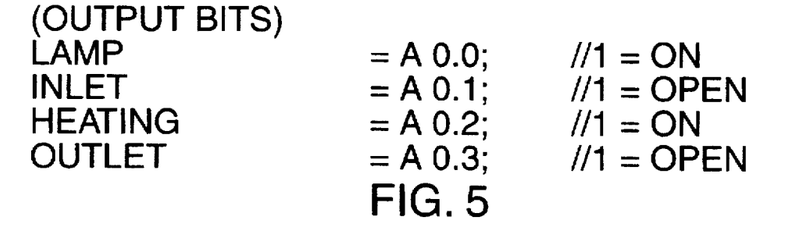
FIG. 5 shows a second table for the assignment of input and output signals, function references and input and output transitions.
Figure 6:
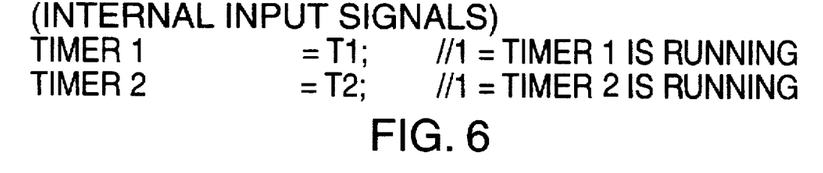
FIG. 6 shows a third table for the assignment of input and output signals, function references and input and output transitions.
Figure 7:
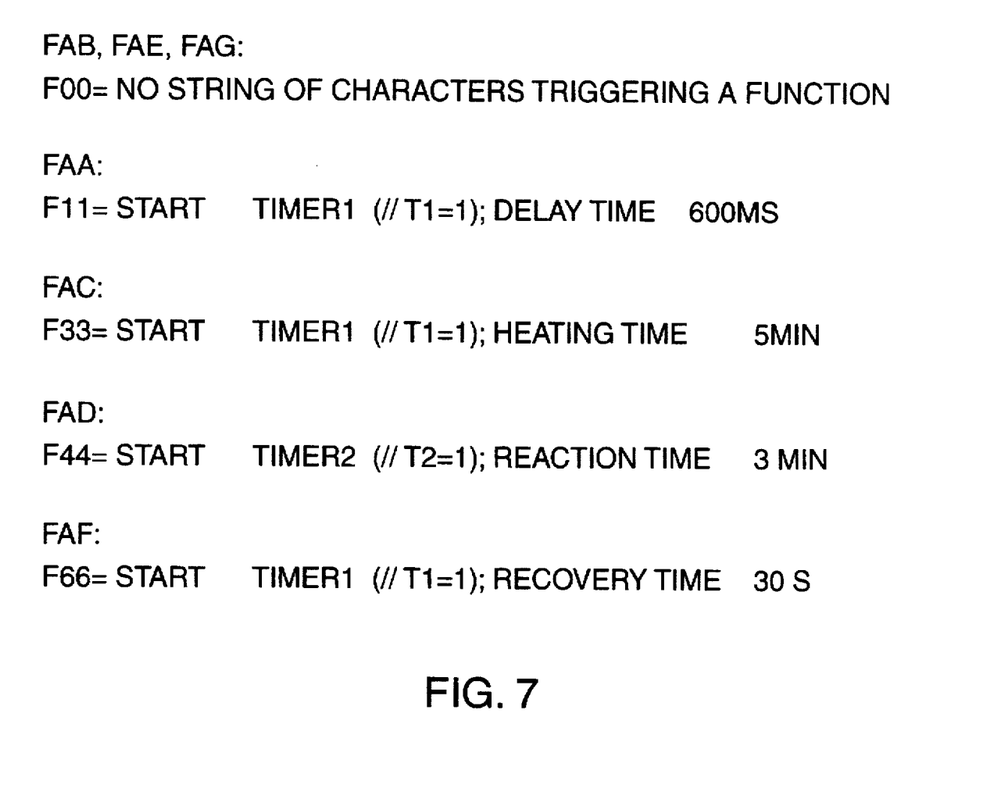
FIG. 7 shows a fourth table for the assignment of input and output signals, function references and input and output transitions.

In the present example, no information is provided in the status graphs regarding the assignments of the input and output vectors or those of the input and output signals, so in order to convert the structured text to a control table (shown in FIG. 9) these assignments must also be stipulated according to the definitions of the control task. It is stipulated that a depressed start key 4 (shown in FIG. 1) be represented by binary value 1 (input signal E0.0=1). Accordingly, E0.1=1 means "the reactor is full" and E0.2=1 means "the reactor is empty"(shown in FIG. 4). Furthermore, the assignment of output signals is defined as A0.0=1 if lamp 8 is turned on, A0.1=1 if inlet 5 is open (or is to be opened), A0.2=1 if heating 7 is switched on and A0.3=1 if outlet valve 6 is open or is to be opened (shown in FIG. 5). Furthermore, as already describe above, function references in the form of strings of characters F00 . . . F66 which stipulate the process times of the control task according to the time limit switch settings of status control system 9 (FIG. 1) are also relevant as additional output quantities in the present example. FIGS. 6 and 7 show the assignment of internal input signals T1, T2 and the function references in the form of character strings F00 . . . F66.

Figure 8:
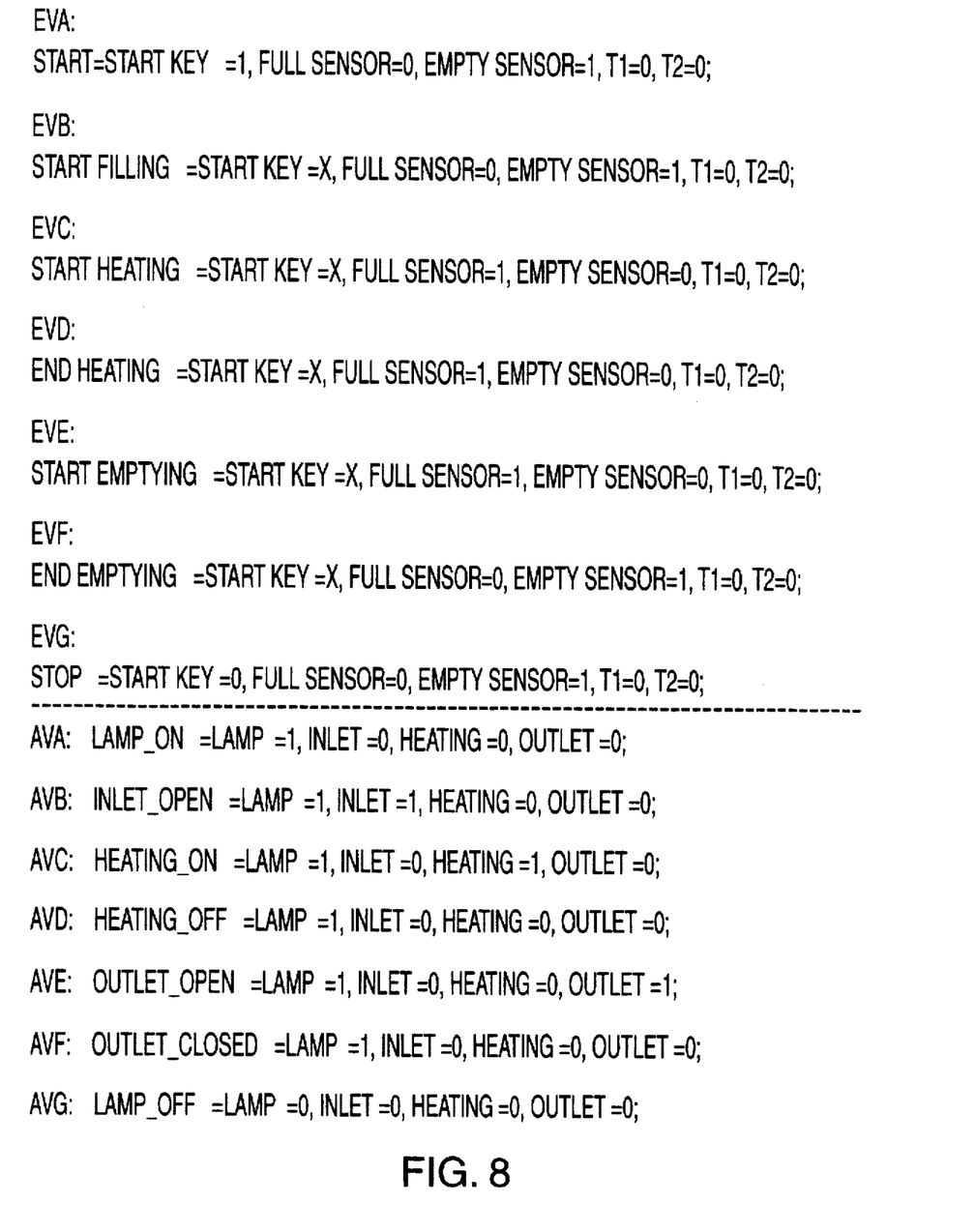
FIG. 8 shows a fifth table for the assignment of input and output signals, function references and input and output transitions.

On the basis of this definition in the assignment tables in FIGS. 4 to 7 and the definitions of the control task, the programmer thus knows which assignments (levels) of input and output signals E0.0, E0.1, E0.2, and A0.0, A0.1, A0.2 are relevant and which subsequent statuses must be reached in applying the relevant input signals, starting from an instantaneous status, and which output signals must be output next to solve the control task. According to this information, input and output vectors EVk and AVk (k=A, B, . . . G) are assigned according to FIG. 8 and finally substructures A . . . G are formulated according to FIG. 3.

The assignment tables according to FIGS. 4 to 8 can of course be omitted if instead of the character strings "start," "begin filling." . . . ; "lamp_on," "inlet_open," . . . the input and output signals are entered for the input and output vectors EVk, AVk, and the assignments shown in FIGS. 4 to 8 for the function references (FAk, . . . ) are entered directly in the symbols of the statuses ZS1, . . . ZS7, the input and output transitions Tr1, . . . Tr7; A1, . . . A7. This has the advantage that the control table shown in to FIG. 9 can be generated directly from the status graph using the software tool. For a better overview of the program, however, it is advantageous to enter only the corresponding character strings and to formulate the assignments in a separate list according to FIGS. 4 to 8. It is also possible to enter just some of the assignments in the symbols of the status graphs, e.g., the output bits according to FIG. 5 in action symbols A1. . . . A7, but the remaining assignments are entered in the assignment lists according to FIGS. 7 and 8 that are provided for this purpose. The character strings ("start,""filling," . . . ) of these transitions provided for this purpose are entered in the symbols of the corresponding transitions TR1, . . . Tr7 in this case.

Once the conversion of the control task in the form of the written structured text is concluded, the software tool generates the control table shown in FIG. 9. To do so, the software tool first generates the corresponding instantaneous status in coded form Z0 (shown in FIG. 9, area 1a) from the first key word SWAL and the first character "dormant"string of substructure A, and finally the input vector assignment in coded is generated form as e01=(10100) from the first ordered pair consisting of the second key word SWA2 ("IF"string) and the input vector EVA ("start" string), taking into account the assignment of the "start" string (shown in FIG. 8), the binary value definition of the input signals and the internal input signals (shown in FIGS. 4 and 6). On the basis of the second pair consisting of the third key word SWA3 ("THEN" string) and the "start of process" string, the software tool creates the code Z1 of the subsequent status. The software tool generates the code for the control data vector assignment as S01=(1000F1) (where F1 denotes a function code formed from character string F11) from the fourth key word SWA4 ("SET"string) and output vector AVA ("lamp" string) and from the fifth key word SWA5 ("DO" string) and function reference FAA ("F11" string), taking into account the assignment of the "lamp_on" string (shown in FIG. 8), the F11 string (shown in FIG. 7) and the binary value definition of the output signals (shown in FIG. 5), where F1 represents a function code formed from the F11 string. Thus the coding (compiling) of substructure A of the structured text is concluded with regard to a change in status from the instantaneous "dormant" status to a subsequent "start of process" status for the case when the assignment is in the form 10100 (=e01) (see area 1a, FIG. 9). There are no other character strings in substructure A, which means that no change of status is provided for all other possible assignments of the input vector, and the software tool automatically creates another code line in area 1a of the control table, namely input vector assignment e00 and a control data vector assignment S00 which are assigned to a subsequent status code Z0 corresponding to the instantaneous status.

In control operation of the programmable status control system, the code lines written in area 1a of the control table cause a change to the subsequent "start of process" status (code Z1) starting from the instantaneous "dormant" status (code Z0) only if the real vector formed from the currently pending input signals E0.0, E0.1, E0.2 and the internal signals T1, T2 of status control system 9 (shown in FIG. 1) have the assignment (10100), i.e., it corresponds to the preset input vector assignment e01. In addition, control data vector S01=(1000F1) is output only for this case. The control system remains in the instantaneous status "dormant" (represented by the "otherwise" string in FIG. 9) for all other current input signals.

In the same manner described here, the software tool generates code lines in areas 1b . . . 1g of the control table from substructures B . . . G. However, substructures B, E and G each lack a fifth key word SW5k and a function reference FAk (k=B, E, G). Therefore, software tool generates a function code F0 for control data vector assignments S11, S41 and S61. This code is of no relevance during control operation of the status control system and does not form any function reference that triggers functions.

The control table thus generated is transferred to the programmable status control system that solves the control task described in German Patent Application Nos. 42 26 456 and 37 43 438 according to the requirements of this table. The transfer can be accomplished by having the control table read out of the memory of the programming device, written to a diskette or a memory module and transferred from there to the user memory of the status control system. The transfer can of course also be accomplished on line via a suitable connection of the programming device to the status control system. The software tool is preferably designed so that it is possible to generate the structured text from a given control table and conversely it is also possible to generate the respective status graph from the structured text, because all information in the structured text is reversibly and unambiguously reflected in the control table and all information in the status graph is reversibly and unambiguously reflected in the structured text.

I claim:

1. A programming device of a programmable status control system, comprising:

a controller for executing a software tool to generate a control task; and a memory apparatus for storing the control task as a status graph which is displayable by a display device and which includes symbols corresponding to statuses, input transitions and output transitions, wherein the controller executing the software tool generates from the status graph a structured text having a plurality of substructures, and wherein the controller executing the software tool generates:

a first key word and a first character string from a status symbol of the symbols corresponding to the statuses and from a corresponding character string assigned to the status symbol, a second key word following the first character string and a second character string following the second key word from at least one transition symbol of the input transition and from a fifth character string assigned to the at least one transition symbol, so that the second character string corresponds to an input vector, a third key word following the second character string and a third character string following the third key word from the status symbol of subsequent statuses and from a sixth character string assigned to the at least one transition symbol, so that the third character string corresponds to the status symbol of the subsequent statuses, and a fourth key word following the third character string and a fourth character string following the fourth key word from an action symbol of an output transition and from a seventh character string assigned to the action symbol, so that the fourth character string corresponds to an output vector.

2. The programming device according to claim 1, wherein the controller executing the software tool further generates a fifth key word following the fourth character string and a function reference following the fifth key word from the fourth character string assigned to the action symbol.

3. The programming device according to claim 1, wherein the symbols are linked with directional lines, the directional lines including a first line starting from the status symbol and leading to the at least one transition symbol, a second line starting from the at least one transition symbol and leading to the status symbol, and a third line starting from the at least one transition symbol and leading to the action symbol.

4. The programming device according to claim 1, wherein the symbols can have a different representation on the display device.

5. The programming device according to claim 1, wherein the controller executing the software tool further generates a control table operable in the status control system from the key words and from the character strings to provide:

an instantaneous status in a coded form from the first key word and from the first character string, an input vector assignment in the coded form from the third key word and the third character string, and a control data vector assignment in the coded form from the fourth key word and the fourth character string.

6. The programming device according to claim 2, wherein the software tool supplements a control data vector assignment with a function code assigned to the function reference from the fifth key word and the function reference.

7. The programming device according to claim 1, wherein the structured text can be converted back to the status graph.

* * * * *